Patented June 5, 1928.

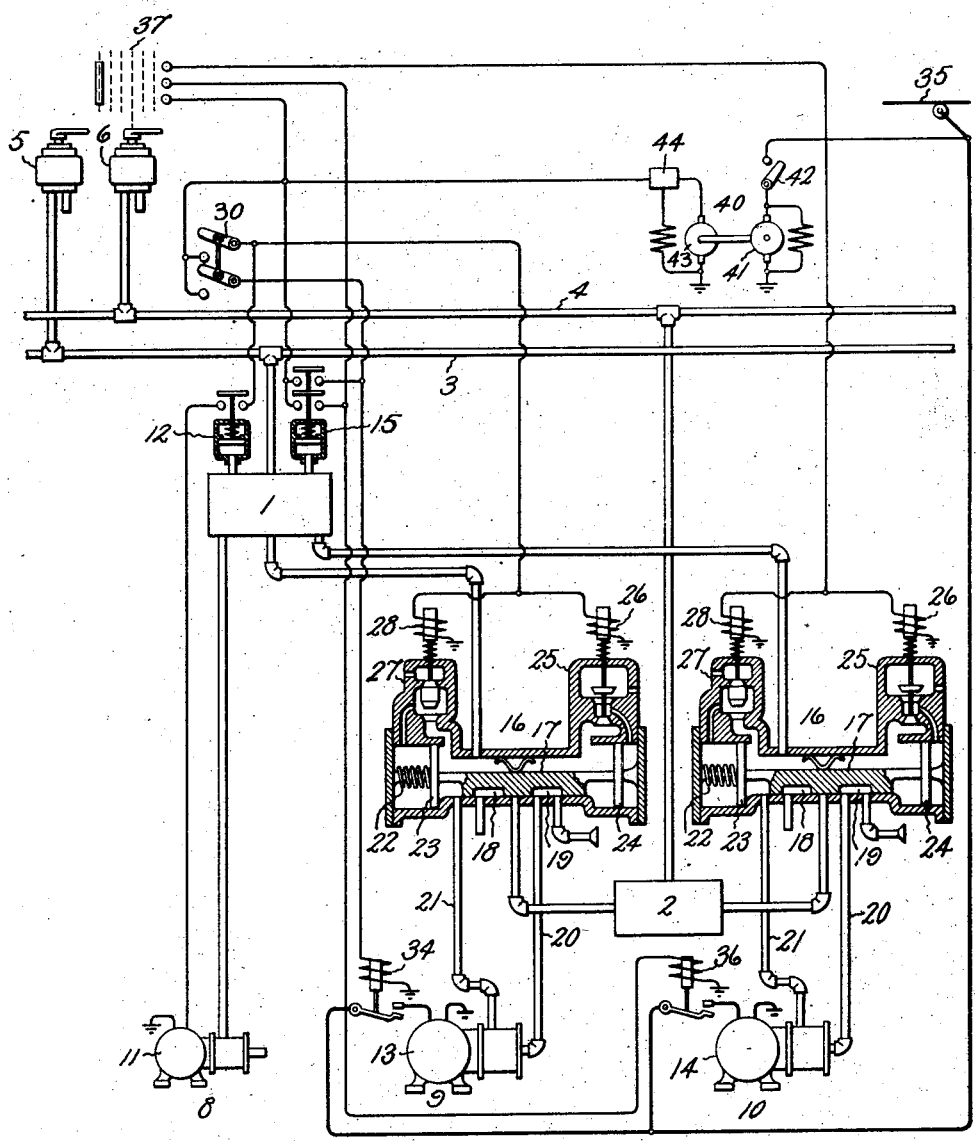

1,672,681

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

CONTROL SYSTEM FOR AIR COMPRESSORS.

Application filed June 23, 1926. Serial No. 118,092.

My invention relates to control systems for air compressors and particularly to control systems for air compressors used on locomotives and the like which are adapted to be used with cars equipped either with air or vacuum brakes.

It is customary to provide such locomotives with air compressors for supplying the air brake system with air pressure and exhausters for establishing the desired vacuum in the vacuum brake system.

One object of my invention is to provide an arrangement whereby a compressor may be used to supply air pressure to the air brake system and may operate also as an exhauster to establish the desired vacuum in the vacuum brake system. An advantage of such an arrangement is that it reduces the number of different kinds of apparatus required on the locomotive.

Another object of my invention is to provide a control arrangement in a combined air and vacuum brake system whereby under certain conditions the vacuum in the vacuum brake system is maintained by an exhauster and the air pressure in the air brake system is maintained within certain limits by an air compressor and whereby under certain other conditions the connections of the air compressor are changed so that it operates as an exhauster to aid in establishing the vacuum in the vacuum brake system.

Another object of my invention is to provide a control arrangement for two air compressors on a locomotive whereby both compressors operate together to maintain the air pressure in the air brake system within predetermined limits when the locomotive is being used with a train equipped with air brakes, and whereby one of the compressors operates as an exhauster and the other compressor operates as a compressor except under certain conditions of the vacuum brake system, when the locomotive is used with a train equipped with vacuum brakes.

My invention will be better understood from the following description, taken in connection with the accompanying drawing, and its scope will be pointed out in the appended claims.

In the accompanying drawing which shows diagrammatically a portion of a combined air and vacuum brake system for a locomotive embodying my invention, 1 and 2 represent the air and vacuum reservoirs respectively, of the air and vacuum brake systems. 3 is the main reservoir pipe of the air brake system and 4 is the vacuum pipe of the vacuum brake system. 5 is an engineer's air brake valve and 6 is an engineer's vacuum brake valve. The brake valve 5 is connected by various pipes, not shown, whereby the engineer on the locomotive can control the air brakes on a train which is equipped with air brakes and the brake valve 6 is connected by various pipes, not shown, whereby the engineer can control the vacuum brakes on a train which is equipped with vacuum brakes. Since my invention does not relate to any particular type of air or vacuum brake system or combination of the two, and such systems are old and well known in the art, I have deemed it desirable to show only such a portion of the two brake systems as will enable one to understand the present invention.

The air reservoir 1 is adapted to be supplied with air pressure from three motor driven air compressors 8, 9 and 10, which may be of any suitable type, examples of which are well known in the art. The circuit of the motor 11 driving the compressor 8 is arranged to be completed by means of a suitable pressure operated switch 12, examples of which are well known in the art, when the pressure in the air reservoir 1 decreases below a predetermined value and to be opened by the switch 12 when the reservoir pressure is above a predetermined value.

The circuits of motors 13 and 14 of the air compressors 9 and 10, respectively, are controlled by a similar pressure operated switch 15 so that they are completed when the pressure in the main reservoir 1 is below a predetermined value and are opened when the pressure is restored to a predetermined value. The compressor 11 is smaller than the other two compressors and the pressure switch 12 is set to operate at lower values of pressure than the pressure switch 15 so that the compressor 11 is in operation only under certain conditions, as will be pointed out more fully hereinafter.

In order that the compressors 9 and 10 may also be used as exhausters to maintain the desired vacuum in the vacuum reservoir 2 when the locomotive is used with a train which is equipped with vacuum brakes, I provide each of these two compressors with a transfer valve 16 whereby the connections of the inlet and outlet pipes of the respective compressors are changed so that instead of taking air from the atmosphere, compressing it and discharging it into an air reservoir, the compressor takes air from the vacuum reservoir, compresses it, and discharges it into the atmosphere. Therefore when the connections are changed in this manner the compressors operate as exhausters for the vacuum brake system.

Each transfer valve 16 comprises a slide valve 17 which is provided with ports 18 and 19. Each valve is so arranged that when it is in the position shown in the drawing, the port 19 connects inlet pipe 20 of its compressor to atmosphere and the outlet pipe 21 is uncovered so that it communicates with the air reservoir 1. Each slide valve 17 is normally biased to the position shown in the drawing by a spring 22 so that if there is no air pressure the valve moves to the compressor position. Attached to each slide valve are two pistons 23 and 24, which are arranged in suitable piston chambers. 25 is a magnet valve which, when its magnet 26 is deenergized, establishes communication between the right hand side of piston 24 and atmosphere and which, when its magnet 26 is energized, establishes communication between the right hand side of piston 24 and the air reservoir 1. 27 is a magnet valve which, when its magnet 28 is deenergized, establishes communication between the left hand side of piston 23 and the air reservoir 1 and which, when its magnet 28 is energized, establishes communication between the left hand side of the piston 23 and atmosphere. It will be observed therefore that when both of the magnets 26 and 28 are deenergized, air pressure will aid the spring 22 in maintaining the valve 17 in the position shown and that when both of the magnets 26 and 28 are simultaneously energized air pressure is admitted to the right hand side of piston 24 and exhausted from the left hand side of piston 23 so that slide valve 17 is moved to the left. In its left position the port 18 of the valve connects outlet pipe 21 of the associated compressor to atmosphere and connects the inlet pipe 20 thereof to the vacuum reservoir 2 so that the associated compressor acts as an exhauster for the vacuum brake system. Therefore, when the magnets 26 and 28 of any transfer valve are deenergized, the associated compressor, when in operation, supplies air pressure to the air reservoir 1 and when the associated magnets 26 and 28 are energized the compressor exhausts air from the vacuum reservoir 2.

In order to control the operation of the compressors 9 and 10 in accordance with the type of brakes on the train with which the locomotive is used, a manually controlled switch 30 is provided for controlling the circuits of the compressor motors 13 and 14 and the magnets 26 and 28 of the transfer valves 17. When the locomotive is used with a train equipped with air brakes, the control switch 30 is placed in its upper position as shown, in which position the circuits of the magnets 26 and 28 are open so that both of the compressors 9 and 10 operate to supply air to the air reservoir 1.

When the locomotive is used with a train equipped with vacuum brakes, the control switch 30 is moved to its lower position, in which position it completes the circuits of the contactor 34, which completes the circuit of compressor motor 13 across the trolley circuit 35, and the circuits of the magnets 26 and 28 of the transfer valve 16 associated with compressor 9 so that the compressor operates continuously as an exhauster to exhaust air from the vacuum reservoir 2. The contactor 36, which completes the circuit of the compressor motor 14 across the trolley circuit 35, is still under the control of the pressure switch 15 so that the compressor 10 operates to maintain the desired pressure in the air reservoir 1, since the locomotive is usually provided with air brakes and therefore it is necessary to maintain air pressure in the reservoir 1.

Since in vacuum brake systems the brakes are applied by breaking the vacuum and the brakes are released by restoring the vacuum, it is desirable to have the evacuating means arranged so that it quickly establishes the desired vacuum in order that a quick release of the brakes may be effected. Therefore, I provide an arrangement whereby the compressor 10 is made to operate as an exhauster to aid the compressor 9 in restoring the vacuum in the vacuum reservoir 2 when the vacuum brakes are being released. For accomplishing this result I provide the vacuum brake valve 6 with a suitable control switch 37 which is arranged so that it is closed when the brake valve is in its release position. Such brake valves, with auxiliary control switches which are closed in certain positions of the valve are old and well known in the art. When the switch 37 is closed, the circuits of the magnets 26 and 28 of the transfer valve 16 associated with the compressor 10 are completed and the circuit of the contactor 36 is completed, so that the compressor 10 operates as an exhauster.

For supplying the various electroresponsive control devices with suitable current, I provide a motor generator set 40, the motor 41 of which is arranged to be connected across the trolley 35 by a suitable switch 42. Any other suitable source of control current, however, may be used. For maintaining the voltage of the generator 43 constant any suitable regulator 44, examples of which are well known in the art, may be used.

It will be observed that when the control switch 30 is in its upper position, both of the compressors 9 and 10 are started and stopped by the closing and opening of the contacts of the pressure operated switch 15 so that the pressure in the main reservoir 1 is maintained within predetermined limits by both compressors operating simultaneously. Since the pressure switch 12 is arranged so that it closes its contacts in response to a lower pressure than switch 15, the auxiliary compressor 8 remains out of service so long as either of the compressors 9 or 10 is operative to supply the necessary air pressure.

When the control switch 30 is in its lower position, the compressor 9 operates continuously as an exhauster and the compressor 10 operates under the control of the pressure operated switch 15 to maintain the air pressure in the reservoir 1 within predetermined limits except when the vacuum brakes are being released when the air compressor 10 operates as an exhauster. In order to insure that there will be sufficient air pressure in the air reservoir to operate the transfer valves 16 and also the locomotive air brakes, the auxiliary air compressor 11 is provided to maintain the air pressure in the reservoir 1 within predetermined subnormal limits while both of the other compressors are operating as exhausters. As the operation of compressor 11 is only occasional and of limited duration it is not necessary to provide capacity in the motor generator set 40 sufficient to operate it continuously which would be the case if the pressure operated switch 12 were set to operate at the same pressures as switch 15.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, an air reservoir, a vacuum reservoir, a compressor, a transfer valve arranged in one position to establish a connection between said air reservoir and said compressor whereby said compressor supplies air under pressure to said air reservoir and in another position to establish a connection between said vacuum reservoir and said compressor whereby said compressor exhausts air from said vacuum reservoir, means for biasing said transfer valve to one of said positions, fluid pressure responsive means for moving said transfer valve against said biasing means, and means for controlling the supply of fluid pressure to said fluid pressure responsive means.

2. In combination, an air reservoir, a vacuum reservoir, a compressor, a transfer valve arranged in one position to establish a connection between said air reservoir and said compressor whereby said compressor supplies air under pressure to said air reservoir and in another position to establish a connection between said vacuum reservoir and said compressor whereby said compressor exhausts air from said vacuum reservoir, means for biasing said transfer valve to said first mentioned position, fluid pressure responsive means for moving said transfer valve from said first mentioned position to the other position against said biasing means, and means for controlling the supply of fluid pressure to said fluid pressure responsive means.

3. In combination, an air reservoir, a vacuum reservoir, a compressor, a transfer valve arranged in one position to establish a connection between said air reservoir and said compressor whereby said compressor supplies air under pressure to said air reservoir and in another position to establish a connection between said vacuum reservoir and said compressor whereby said compressor exhausts air from said vacuum reservoir, a spring for biasing said transfer valve to said first mentioned position, a piston attached to said valve, and means for controlling the air pressure on one side of said piston to effect the movement of said valve to said other position.

4. In combination, an air reservoir, a vacuum reservoir, a compressor, a pneumatically operated transfer valve arranged in one position to establish a connection between said air reservoir and said compressor whereby said compressor supplies air under pressure to said air reservoir and in another position to establish a connection between said vacuum reservoir and said compressor whereby said compressor exhausts air from said vacuum reservoir, electromagnetically operated means for controlling the connection between said pneumatically operated valve and said air reservoir, and means for controlling the operation of said electromagnetically operated means.

5. In combination, an air reservoir, a vacuum reservoir, a compressor, a pneumatically operated transfer valve arranged in one position to establish a connection between said air reservoir and said compressor whereby said compressor supplies air under pressure to said air reservoir and in another position to establish a connection between said vacuum reservoir and said compressor whereby said compressor exhausts air from said vacuum reservoir, two pistons attached to said valve, and means for establishing communication between one side of one of said pistons and atmosphere and between the opposite side of the other of said pistons and said air reservoir to effect the movement of said valve from one of said positions to the other.

6. In combination, an air reservoir, a vacuum reservoir, a compressor, a pneumatically operated transfer valve arranged in one position to establish a connection between said air reservoir and said compressor whereby said compressor supplies air under pressure to said air reservoir and in another position to establish a connecton between said vacuum reservoir and said compressor whereby said compressor exhausts air from said vacuum reservoir, two pistons attached to said valve, and means for establishing communication between one side of one of said pistons and atmosphere and between the opposite side of the other of said pistons and said air reservoir to effect the movement of said valve from one of said positions to the other and for establishing communication between said one side of said one of said pistons and said air reservoir and between the said opposite side of the said other of said pistons and atmosphere to effect the movement of said valve from said other position to said one of said positions.

7. In a combined air and vacuum brake system, a vacuum brake valve for controlling the operation of the brakes, a compressor, a vacuum reservoir, an air reservoir, means for connecting said compressor so that it operates as an exhauster to maintain a vacuum in said vacuum reservoir, a second compressor normally arranged to maintain the pressure in said air reservoir within predetermined limits, and means controlled by said vacuum brake valve for effecting a change in the connections of said second compressor so that it operates as an exhauster for said vacuum reservoir.

8. In a combined air and vacuum brake system, a vacuum brake valve for controlling the operation of the brakes, a compressor, a vacuum reservoir, an air reservoir, means for connecting said compressor so that it operates as an exhauster to maintain a vacuum in said vacuum reservoir, a second compressor normally arranged to maintain the pressure in said air reservoir within predetermined limits, and a transfer valve controlled by said vacuum brake valve for effecting a change in the connections of said second compressor when said brake valve is in a position to release the vacuum brakes so that said second compressor operates as an exhauster to assist said first mentioned compressor in restoring the vacuum in said vacuum reservoir.

9. In a combined air and vacuum brake system, a vacuum brake valve for controlling the operation of the brakes, a compressor, a vacuum reservoir, an air reservoir, means for connecting said compressor so that it operates as an exhauster to maintain a vacuum in said vacuum reservoir, a second compressor normally arranged to maintain the pressure in said air reservoir within predetermined limits, a transfer valve controlled by said brake valve for effecting a change in the connections of said second compressor when said brake valve is in a position to release the vacuum brakes so that said second compressor operates as an exhauster to assist said first mentioned compressor in restoring the vacuum in said vacuum reservoir, and a third compressor arranged to maintain the pressure in said air reservoir within predetermined limits while said second compressor is operating as an exhauster.

In witness whereof, I have hereunto set my hand this 22nd day of June, 1926.

WILLIAM S. H. HAMILTON.